United States Patent
Umland

(10) Patent No.: US 9,270,117 B2
(45) Date of Patent: Feb. 23, 2016

(54) LEVELLING PARTIAL POWERS FLOWING VIA THE INDIVIDUAL PHASES OF A MULTI-PHASE AC GRID

(75) Inventor: Andreas Umland, Kassel (DE)

(73) Assignee: SMA Solar Technology AG, Niestetal (DE)

(*) Notice: Subject to any disclaimer, the term of this patent is extended or adjusted under 35 U.S.C. 154(b) by 793 days.

(21) Appl. No.: 13/549,866

(22) Filed: Jul. 16, 2012

(65) Prior Publication Data

US 2012/0280566 A1   Nov. 8, 2012

Related U.S. Application Data

(63) Continuation of application No. PCT/EP2011/050746, filed on Jan. 20, 2011.

(30) Foreign Application Priority Data

Jan. 20, 2010   (EP) ...................................... 10151249

(51) Int. Cl.
    *H02J 1/00*    (2006.01)
    *H02J 3/14*    (2006.01)
    *H02J 3/26*    (2006.01)

(52) U.S. Cl.
    CPC .. *H02J 3/26* (2013.01); *Y02E 40/50* (2013.01); *Y10T 307/414* (2015.04)

(58) Field of Classification Search
    CPC ................. H02J 3/14; H02J 1/14; H02J 3/00; H02J 7/04; H02J 7/00; H02M 2001/008; H02M 7/42; H02M 7/537; H02M 3/335; Y02B 70/3225; Y04S 20/222; H01L 21/761; H01L 21/762; B60K 26/00; G06Q 40/00
    USPC ........ 307/32, 82, 80, 72, 64, 43, 66; 363/131, 363/132, 95; 320/137, 155; 705/30, 39
    See application file for complete search history.

(56) References Cited

U.S. PATENT DOCUMENTS

| | | |
|---|---|---|
| 4,177,508 A | 12/1979 | Schmid |
| 6,069,779 A | 5/2000 | Glavitsch et al. |

(Continued)

FOREIGN PATENT DOCUMENTS

| | | |
|---|---|---|
| CN | 200973019 Y | 11/2007 |
| EP | 0891029 A2 | 1/1999 |

(Continued)

OTHER PUBLICATIONS

English translation of the Abstract of Ji Jianqiang "Study of Three-Phase PWF Voltage-Source-Rectifier Under Unbalanced Input Voltage Conditions" Master Dissertation, Hefei University of Technology, published Sep. 15, 2004.

(Continued)

*Primary Examiner* — Rexford Barnie
*Assistant Examiner* — Jagdeep Dhillon
(74) *Attorney, Agent, or Firm* — Eschweiler & Associates, LLC

(57) ABSTRACT

For levelling the partial powers which flow at a grid connection point between a multi-phase AC power grid having a plurality of phase conductors and a unit for feeding electric energy into the AC power grid having a multi-phase inverter as well as electric consumer loads connected to the AC power grid, via the individual phase conductors, differences between the partial powers flowing via the individual phase conductors are determined and are reduced by feeding different partial powers with the inverter into the individual phase conductors.

18 Claims, 2 Drawing Sheets

(56) References Cited

U.S. PATENT DOCUMENTS

| | | | |
|---|---|---|---|
| 7,576,449 B2 | 8/2009 | Becker et al. | |
| 8,097,980 B2 * | 1/2012 | Cyrus et al. | H02J 3/383 |
| | | | 307/64 |
| 8,154,893 B2 | 4/2012 | Iwata et al. | |
| 8,259,468 B2 * | 9/2012 | Mallwitz | H02M 7/5387 |
| | | | 363/137 |
| 2007/0179720 A1 | 8/2007 | Becker et al. | |
| 2008/0266922 A1 * | 10/2008 | Mumtaz et al. | H01L 21/84 |
| | | | 363/131 |
| 2010/0006356 A1 * | 1/2010 | Curry et al. | B60L 8/00 |
| | | | 180/65.8 |
| 2010/0014335 A1 | 1/2010 | Iwata et al. | |
| 2010/0084924 A1 * | 4/2010 | Frolov et al. | H01L 31/02021 |
| | | | 307/82 |

FOREIGN PATENT DOCUMENTS

| | | | |
|---|---|---|---|
| EP | 2114002 A1 | 11/2009 | |
| JP | 05308780 | 11/1993 | |
| JP | 2002238166 | 8/2002 | |
| JP | 2007166869 A | 6/2007 | |
| JP | 2008005611 A | 1/2008 | |
| WO | 2006084294 A1 | 8/2006 | |
| WO | 2008139758 A1 | 11/2008 | |

OTHER PUBLICATIONS

English translation of a Chinese Office Action dated Nov. 5, 2014 for co-pending Chinese Application No. 201180006636.1.

"Renewable Energy Sources Act of Oct. 25, 2008 (Federal Law Gazette I p. 2074) as last amended by the Act of Aug. 11, 2010 (Federal Law Gazette I p. 1170)" Oct. 25, 2008. 58 Pages.

SMA Product Sunny Island 2012/2224. Obtained on Jun. 8, 2012 from http://www.sma.de/en/products/off-grid-inverters/sunny-island-2012-2224.html 3 Pages.

International Search Report for International Application No. PCT/EP2011/050746 dated Feb. 28, 2011. 10 Pages.

English Translation of Final Office Action dated Feb. 13, 2015 JP Patent Application 2012-549354.

\* cited by examiner

LEVELLING PARTIAL POWERS FLOWING VIA THE INDIVIDUAL PHASES OF A MULTI-PHASE AC GRID

REFERENCE TO RELATED APPLICATIONS

This application is a continuation of International Application Number PCT/EP2011/050746 filed on Jan. 20, 2011, which claims priority to European Application Number EP 10151249.9 filed on Jan. 20, 2010.

FIELD

The invention relates to a method of levelling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors.

BACKGROUND

It is known to limit asymmetrical loads in taking power for a plurality of consumer loads out of a multi-phase AC power grid in that the single-phase consumer loads are distributed over the individual phases of the multi-phase AC power grid. This measure, however, only provides levelling of the partial powers flowing via the individual phase conductors of the multi-phase AC power grid with regard to the statistical average.

In grid connection points displaying high impedances towards a connected AC power grid, voltage drops with regard to the grid voltage occur upon taking high powers from the AC power grid. It is known to compensate this effect by a variable transformer. In case of an asymmetrical load on the individual phases, however, the voltage differences resulting between the phases at the grid connection point displaying high impedances towards the AC power grid can not be compensated by means of a variable transformer.

As already indicated, undesired asymmetrical power distributions also occur In single-phase feeding electric energy into a multi-phase AC power grid. From DE 10 2006 003 904 A1 it is known to counter-act these asymmetries in that electric powers fed by a plurality of single-phase inverters into an AC power grid are evenly distributed over the phases of the AC power grid and that upon breakdown of one inverter feeding into one phase, the powers of the other inverters feeding in the other phases are limited.

An inverter system for individually feeding into the phases of a three-phase AC power grid is known from WO 2006/084294 A1. Here, a plurality of single-phase inverters are, at their input ends, connected to a power bus into which a plurality of photovoltaic power generators feed. The power fed by the photovoltaic power generators into the power bus changes with the solar radiation. The individual inverters are combined or connected in parallel for feeding the power presently available on the power bus into the AC power grid with a suitable low number of inverters to limit power losses. To the end of avoiding unbalanced loads on the phases, the single-phase inverters feeding power are pooled in three groups, i.e. in one group per phase.

The assignee of the present disclosure sells a bi-directional battery inverter called "Sunny Island", which may be used as a grid former for island networks and which compensates for asymmetrical loads on the phases of the island networks by taking power from the un-loaded phases and outputting power to the loaded phases. This power compensation, however, has power losses within the bi-directional inverter as a consequence.

U.S. Pat. No. 4,177,508 discloses an apparatus for use in balancing an asymmetrical load which is supplied from a three-phase network. The apparatus is provided with an inverter for generating a three-phase output current system on its AC side which is fed with phases reversed to the network. The DC side of the inverter, in turn, is fed from a DC source with a DC current corresponding to the maximum asymmetry power to be balanced. Preferably, the DC source is a rectifier connected to the network. Thus, the entire known apparatus is only provided for balancing the asymmetrical load, and it means considerable costs and power losses.

The case of an extreme unbalanced load due to taking power at the grid connection point via one phase while simultaneously feeding power into the AC power grid via another phase, which has been mentioned at the beginning, is a disadvantage independently of the unbalanced load provoked in the AC power grid, if self-consumption of the electric power provided by an inverter has advantages. These advantages generally include that a self-consumption of locally generated electric power does not load the AC power grid. Additional financial advantages may result, if the electric energy taken from the AC power grid is more expensive than the electric power fed into the AC power grid. A financial advantage may, however, also occur, if an incentive for self-consumption of locally generated electric energy is higher than the difference between the payment for the electric energy fed into the grid and the price of electric energy taken from the grid. This is the case according to the German Erneuerbare-Energien-Gesetz in the version valid since Jan. 1, 2009 (EEG 2009). If the self-consumption has financial advantages, the case of feeding electric power via one phase while simultaneously taking electric power via another phase of the AC power grid is to be avoided by all means.

EP 2 114 002 A1 discloses a three-phase power conversion device connected between output terminals of a solar battery and a three-phase power system. The conversion device comprises a three-phase inverter circuit and single-phase inverters connected in series with AC output lines of the three-phase inverter circuit. The three-phase inverter circuit outputs a reverse-polarity voltage pulse during a period corresponding to a half cycle of a system voltage. A power burden born by the individual single-phase inverters in each half cycle is made approximately zero, and the individual single-phase inverters make a correction for subtracting a common voltage from target output voltages of individual phases during the period when the reverse-polarity voltage pulse is generated. There is no reference to balancing any loads on individual phases of the three-phase power system.

There still is a need for a method, an apparatus and an inverter for levelling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors, by which a self-consumption of locally generated power is optimized and by which asymmetrical loads on a multi-phase AC power grid at the grid connection point are reduced in general.

SUMMARY OF THE INVENTION

In one aspect, the present invention provides a method of levelling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors. The method comprises determining differences between the partial powers flowing via the individual phase conductors, and using the inverter to reduce the differences determined by feeding different partial powers into the individual phase conductors.

In another aspect, the present invention provides an apparatus for leveling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors, for example, according to the method defined above. The apparatus comprises measurement devices that determine differences between the partial powers flowing via the individual phase conductors, and a control device which operates the inverter to reduce the differences determined by the measurement devices by means of feeding different partial powers into the individual phase conductors.

In a further aspect, the present invention provides a multi-phase inverter for levelling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors, for example, according to the method defined above. The inverter comprises a controller which is capable of operating the inverter for purposefully feeding different partial powers into the individual phase conductors.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
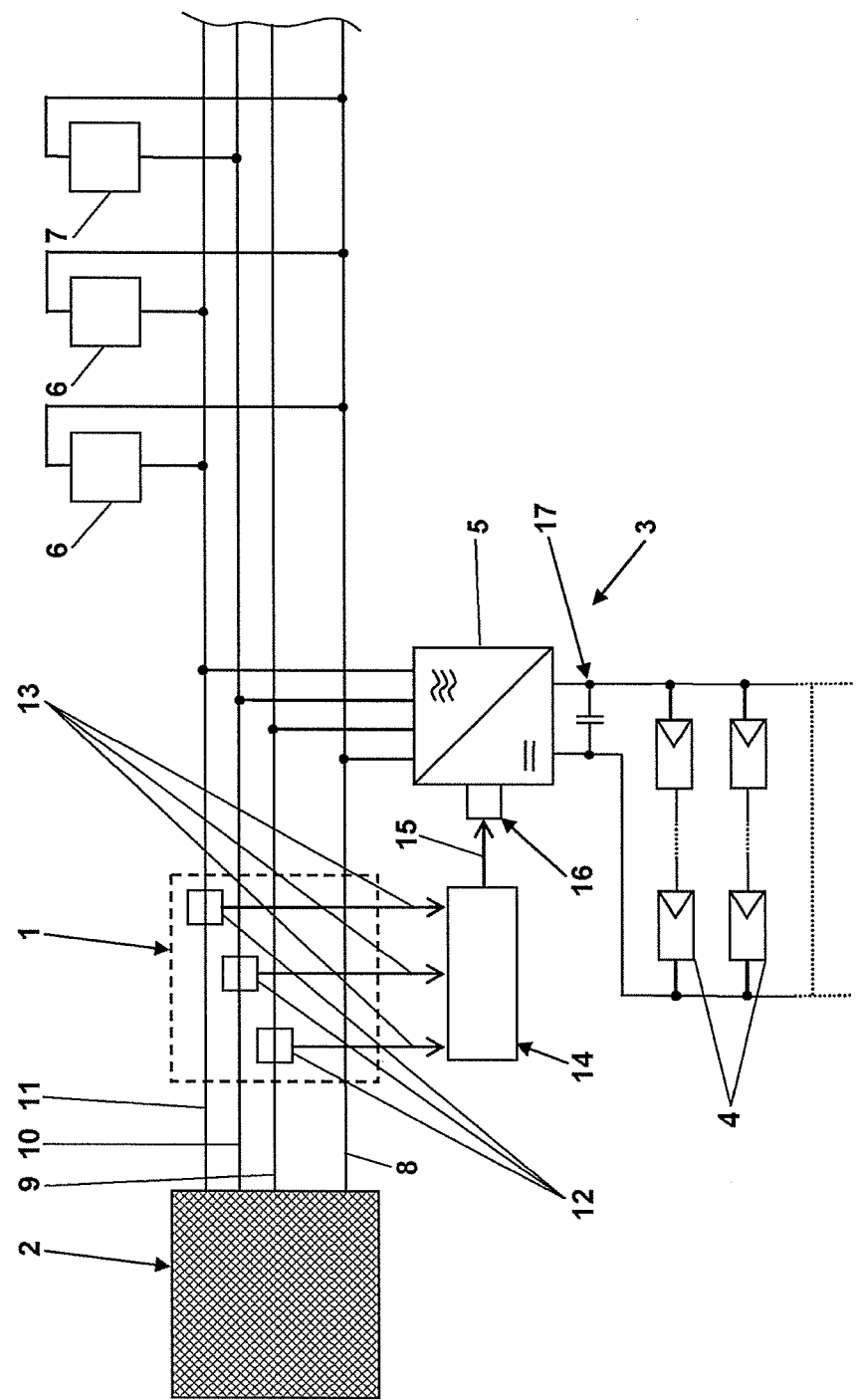
FIG. 1 illustrates the implementation of the new method with a first embodiment of the new apparatus and the new inverter.

The invention relates to a method of levelling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors.

Further, the invention relates to an apparatus for levelling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors. This apparatus shall serve for implementing the method of the invention in one embodiment.

Further, the invention relates to a multi-phase inverter for levelling partial powers at a grid connection point between a multi-phase AC power grid comprising a plurality of phase conductors, on the one hand, and a unit including a multi-phase inverter, which feeds electric energy into the AC power grid, plus consumer loads connected to the AC power grid, on the other hand, the partial powers flowing via the individual phase conductors. This multi-phase inverter shall also serve for implementing the new method in one embodiment.

The grid connection point can be a transit point at which a connection to a public power grid is provided. As an alternative, a local grid forming unit providing the AC power grid may be provided at the grid connection point.

In one embodiment the multi-phase AC power grid is a three-phase AC power grid. Generally, however, the present invention may be applied to any multi-phase AC power grid, like for example a two-phase AC power grid.

Levelling or matching the partial powers flowing over the individual phase conductors as it is intended with the present invention includes the reduction of unbalanced loads, i.e. of asymmetrical loads on the individual phases of a multi-phase AC power grid due to a connected single-phase consumer load, for example. The present invention, however, does not only consider that electric power is taken from the AC power grid, but also that electric power is fed into the AC power grid at the grid connection point. If this feeding is also carried out via a single phase but via another phase than that one to which the single-phase consumer load is connected, a situation may occur in which electric power flows out of the AC power grid via one phase, whereas electric power is fed into the AC power grid via another phase at the grid connection point. This is an extreme case of an unbalanced load.

In the new method according to one embodiment, differences between the partial powers flowing over the individual phase conductors of the multi-phase AC power grid are determined and reduced by feeding different partial powers with the multi-phase inverter into the individual phase conductors. In on embodiment of the invention, the multi-phase inverter is used for levelling the electric powers flowing via the individual phase conductors. To this end, it has to be controllable in a special way so that its output power can be concentrated to that phase or phase conductor of the AC power grid from which the highest electric power is presently consumed. A sufficient basic capability for this purpose is already existing with some present inverters which only have to be amended with regard to their controller or even only with regard to software executed by the controller in operating the inverter.

To the end of optimizing the self-consumption of the locally generated electric power by means of focussing the power fed by the multi-phase inverter to one or few phases or phase conductors, it is sufficient to determine power flow directions through the individual phase conductors at the grid connection point and to compare them with each other. If all power flow directions are the same, i.e. if electrical power is taken out of the AC power grid or fed into the AC power grid via all phases, no action is necessary. If, however, the power flow directions, i.e. the signs of the power take-up, differ from each other, this condition has to be abandoned by selectively feeding electric power with the inverter. To this end, dimensioning of the inverter with regard to the partial outputs stages attributed to the individual phases of the AC power grid needs not to be varied as compared to the usual part of the maximum feeding power, if, at maximum feeding power, the locally generated electric power exceeds the locally consumed electric power anyway. If the multi-phase inverter, however, is of basically smaller dimension, it is an advantage, if it may be able to concentrate its entire feeding power, even with maximum feeding power, to a single phase or phase conductor of the multi-phase AC power grid.

To the end of also delimiting asymmetrical loads which do not result in different power flow directions through the individual phase conductors of the AC power grid, the partial powers flowing through the individual phase conductors may not only be determined and compared with regard to their sign or direction but also with regard to their value, to then matching them by selectively feeding power with the inverter into the individual phase conductors.

To the end of determining the partial powers flowing over the individual phase conductors, the currents flowing therethrough may be individually determined and compared to each other. If, however, impedances with regard to the AC power grid dominate at the net connection point over impedances between the net connection point and the inverter, differences between the effective voltages present at the individual phase conductors may be determined and reduced by feeding different partial powers into the individual phase conductors with the inverter. In this case, the powers flowing through the individual phase conductors are compared with each other by means of their effect onto the effective voltage present.

It is to be understood that the inverter used in the new method does not work according to the principle that it only reduces the electric power fed into the other phases of the AC power grid to which it shall not concentrate its feeding power at present. Instead, the inverter focuses its feeding power into the phase into which it should presently feed in a concentrated way in that it increases its feeding power into this phase. To this end, the multi-phase inverter is or can at least be fed from the same power sources with regard to its feeding power into all individual phases of the AC power grid. Particularly, the different high partial powers may be fed by the inverter out of a common link into the individual phase conductors of the AC power grid. I.e. the entire available electric energy flows via the link and is then allocated by the inverter to the phase or to the phases of the AC power grid into which feeding of electric energy is suitable at present. Particularly, the different partial powers may be realized by feeding different currents into the individual phase conductors. In realizing the inverter by a plurality of single-phase inverters, several energy sources may be connected to the single-phase inverters attributed to the individual phases as desired. Such a switching of energy sources between various inverters is generally known from DE 100 61 724 A1.

The apparatus according to the invention is characterized by measuring devices which determine differences between the partial powers flowing over the individual phase conductors, and by a control device which reduces the differences by feeding different partial powers with the inverter into the individual phase conductors. The measuring devices may only measure the power flow directions through the individual phase conductors or also the partial powers or currents flowing through the individual phase conductors and/or the effective voltages present at the individual phase conductors separately.

The control devices are at least configured in such a way that they match the power flow direction through the individual phase conductors. Additionally, the values of the partial powers, the values of the currents flowing through the phase conductors and/or the effective voltages present at the phase conductors may be matched.

The inverter according to one embodiment of the invention is characterized by a controller which is configured to feed-in different partial powers into the individual phase conductors. As already indicated, it is an advantage, if the inverter feeds the different partial powers out of a common link into the individual phase conductors, and that this is realized by feeding different currents into the individual phase conductors. Particularly, the inverter may have one or more inverting circuits each generating a multi-phase output current, or it may be built-up from one or several single-phase inverters per phase. With regard to the feeding power into the individual phases, the inverter is configured in such a way that, with a three-phase inverter, at least 50% of its entire maximum feeding power, preferably at least 75% of its entire maximum feeding power, and most preferred its entire maximum feeding power can be fed into a single phase conductor to be able to completely concentrate the feeding power of the multi-phase inverter to a single phase of the AC power grid not only in the partial-load operational range.

Referring now in greater detail to the drawings, FIG. 1 shows a grid connection point 1 between a three-phase AC power grid 2, on the one hand, and a unit 3 for feeding electric energy from a plurality of photovoltaic generators 4 having an inverter 5 and a plurality of electric consumer loads 6 and 7, on the other hand. The lines of the AC power grid 2 include a zero conductor 8 and three phase conductors 9, 10 and 11 for the three phases of the AC power grid 2. The inverter 5 feeds into all three phase conductors 9, 10 and 11. The consumer loads 6 and 7 are single-phase consumer loads which each take electric power from one phase of the AC power grid 2, only, The consumer loads 6 are connected between the phase conductor 11 and the zero conductor 8, and the consumer load 7 is connected between the phase conductor 10 and the zero conductor 8. There may be more consumer loads than the depicted consumer loads 6 and 7, some of which may also be connected between the phase conductor 9 and the zero conductor 8. At the grid connection point 1, the electric powers flowing via the individual phase conductors 9 to 11, particularly their power flow directions, are determined by measuring devices 12. The measuring devices 12 may be meters which phase by phase monitor the electric energy taken out of the AC power grid 2 and the electric energy fed therein. The measurement signals 13 of the measurement devices 12 are forwarded to a control device 14 which outputs a control signal 15 to a controller 16 of the inverter 5. The controller 16 distributes the feeding power of the inverter 5 over the individual phase conductors 8 to 11. Here, the present feeding power of the inverter 5 can be concentrated to one or two of the phases of the AC power grid 2 as the entire feeding power flows via a link 17 to which all photovoltaic generators 4 are connected.

If the three consumer loads 6 and 7 each comprise a power consumption of one third of the present feeding power of the inverter 5 and assuming a uniform distribution of the feeding power of the inverter 5 over the phase conductors 9 to 11, electric power would be taken from the AC power grid 2 via the phase conductor 11 and electric power would be fed into the AC power grid 2 via the phase conductor 9. This is due to the fact that the two consumer loads 6 are connected to the phase conductor 11 and together consume twice as much electric power as provided by the inverter 5 there, whereas no consumer load 6 or 7 is connected to the phase conductor 9, and thus the power fed therein by the inverter 5 is fed into the AC power grid 2. To avoid this situation in which both electric energy is taken from the AC power grid 2 and electric energy is fed into the AC power grid 2, and in which the AC power grid 2 is thus, without any need, loaded with an unbalanced load only, the control device 14 operates the controller 16 of the inverter 5 in such a way that its feeding power into the phase conductor 11 increases, taking the feeding power from phase conductor 9 until at least all power flow directions through the individual phase conductors are the same at the grid connection point 1. In the present case, no electric power would then flow via the net connection point at all. Instead, the inverter 5 would supply the consumer loads 6 and 7 in the sense of a complete self-consumption of the locally generated electric energy.

If the total locally generated electric energy differs from the locally consumed electric energy, the control device 14 operates the controller 16 of the inverter 5 in such a way that via all phase conductors 9 to 11 electric energy is either fed into the AC power grid 2 or electric energy is taken from the AC power grid 2. This assures that the locally generated electric energy is consumed locally to a maximum extent. At the same time, any asymmetrical load on the AC power grid 2 is reduced. In this reduction of the unbalanced load one may even proceed further in that the control device 14 also cares for levelling the values of the electric powers flowing via the individual phase conductors 9 to 11 with regard to each other.

The AC power grid 2 may not only be a public power grid but also, for example, be provided by a bi-directional battery inverter as a grid former, i.e. be an island network, for example. Then, the control device 14, by operating the controller 16 of the inverter 5, avoids electric power from being diverted from one phase into a another phase of the AC power grid 2 by the bi-directional battery inverter, which causes undesired power losses. These undesired power losses particularly occur if—in an island network which is connected to such a grid former—there is a deficit of energy, i.e. in a situation in which any unnecessary consumption of electric energy is to be avoided. The implementation of the new method thus also has considerable advantages even with grid connection points between grid formers and island networks.

The inverter 5 may also be made of two or more single-phase inverters which only feed electric power into one of the phase conductors 9 to 11 but which are themselves fed or which may at least be fed out of the same energy sources, i.e. for example the same photovoltaic generators, to feed variable parts of the entire electric power available into the individual phase conductors 9 to 11.

Figure 2:
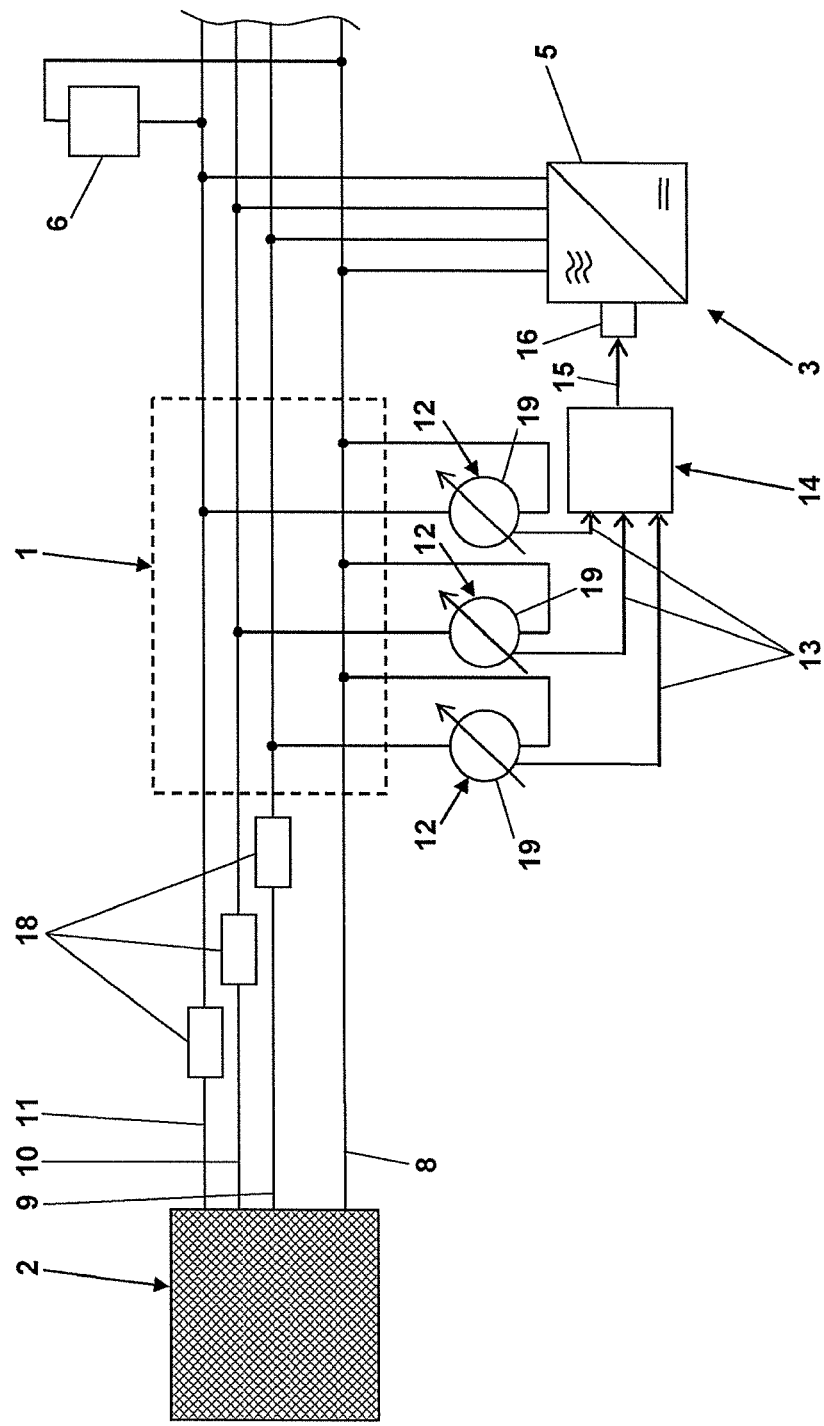
FIG. 2 illustrates the implementation of the new method with a second embodiment of the new apparatus and the inverter according to FIG. 1.

In FIG. 2, a high impedance of the AC power grid 2 at the grid connection point 1 is indicated by resistors 18. This impedance has the result that upon taking electric power from the phase conductors 9 to 11 at the grid connection point 1, the grid voltage at the grid connection point 1 drops. With only taking the electric power only out of one phase conductor 11, as indicated by a single consumer load 6 here, only the grid voltage present at this phase conductor 11 drops. Vice versa, a non-symmetry of the grid voltages at the individual phase conductors may, for example, also occur if electric energy is only fed into one of the phase conductors by an additional single phase inverter not depicted here, and in that the grid voltage at this phase conductor increases accordingly. In each case, the non-symmetry of the grid voltages is determined by the measurement devices 12 which are designed as voltmeters here. The control device 14 levelling the voltages measured with the voltmeters 19 via the control signal 15 also cares for the asymmetrical load or feeding power being reduced, and particularly avoids that electric power is taken via one phase of the AC power grid 2 whereas electric power is fed into another phase of the AC power grid 2.

What is claimed is:

1. A method of levelling partial powers at a grid connection point between a multi-phase AC power grid comprising a plurality of phase conductors and a unit including a multi-phase inverter which feeds electric energy into the AC power grid plus consumer loads connected to the AC power grid through the grid connection point, the partial powers flowing via the individual phase conductors, comprising:
   determining differences between the partial powers flowing through the individual phase conductors at the grid connection point; and
   using the inverter via a control device to reduce the determined differences by feeding different partial powers into the individual phase conductors,
   wherein determining differences between the partial powers comprises determining directions of the partial powers flowing through the individual phase conductors and comparing the determined directions with each other to determine the differences between the partial powers to be reduced.

2. The method of claim 1, wherein determining differences between the partial powers comprises determining the partial powers flowing through the individual phase conductors and comparing the partial powers with each other to determine the differences between the partial powers to be reduced.

3. The method of claim 1, wherein determining differences between the partial powers comprises determining currents flowing through the individual phase conductors and comparing the determined currents with each other to determine the differences between the partial powers to be reduced.

4. The method of claim 1, wherein in the case that dominating impedances exist with regard to the AC power grid, determining differences between the partial powers comprises determining differences between the effective voltages present at the individual phase conductors and comparing the effective voltages with each other to determine the differences between the partial powers to be reduced.

5. The method of claim 1, wherein, in the step of reducing, the different partial powers are fed with the inverter out of a common link into the individual phase conductors.

6. The method of claim 5, wherein, in the step of reducing, the different partial powers are fed by feeding different currents with the inverter out of a common link feeding the inverter into the individual phase conductors.

7. An apparatus for leveling partial powers at a grid connection point between a multi-phase AC power grid comprising a plurality of phase conductors and a unit including a multi-phase inverter which feeds electric energy into the AC power grid and consumer loads connected to the AC power grid, the partial powers flowing via the individual phase conductors, the apparatus comprising:
   measurement devices configured to determine differences between the partial powers flowing via the individual phase conductors; and
   a control device configured to operate the inverter to reduce the differences determined by the measurement devices by feeding different partial powers into the individual phase conductors in response to the determined differences,
   wherein the measurement devices are configured to determine directions of the partial powers flowing through the individual phase conductors, and wherein the control device is configured to level the power flow directions through the individual phase conductors in response thereto.

8. The apparatus of claim 7, wherein the measurement devices are configured to determine the partial powers flowing through the individual phase conductors, and wherein the control device is configured to level the partial powers flowing through the individual phase conductors in response thereto.

9. The apparatus of claim 7, wherein the measurement devices are configured to determine the currents flowing through the individual phase conductors, and wherein the control device is configured to level the currents flowing through the individual phase conductors in response thereto.

10. The apparatus of claim 7, wherein the measurement devices are configured to determine effective voltages present at the individual phase conductors, and wherein the control device is configured to level the effective voltages present at the individual phase conductors in response thereto.

11. A multi-phase inverter for levelling partial powers at a grid connection point between a multi-phase AC power grid comprising a plurality of phase conductors and a unit including a multi-phase inverter which feeds electric energy into the AC power grid and consumer loads connected to the AC power grid, the partial powers flowing via the individual phase conductors, wherein the inverter comprises a controller configured to operate the inverter to feed different partial powers into the individual phase conductors in response to identified differences in partial powers to minimize the identified differences, wherein the differences between the partial powers are identified based at least in part on determined directions of the partial powers flowing through the individual phase conductors and comparisons of the determined directions with each other to identify the differences between the partial powers to be reduced.

12. The inverter of claim 11, wherein the inverter feeds the different partial powers out of a common link into the individual phase conductors.

13. The inverter of claim 12, wherein the inverter feeds the different partial powers by feeding different currents out of the common link into the individual phase conductors.

14. The inverter of claim 12, wherein the inverter comprises a multi-phase inverter circuitry fed out of the common link.

15. The inverter of claim 12, wherein the inverter comprises several single-phase inverters fed out of the common link.

16. The inverter of claim 12, wherein the output partial stages of the inverter, which are attributed to the individual phase conductors, are configured to feed at least 50% of an entire maximum feeding power of the inverter into a single phase conductor of the individual phase conductors.

17. The inverter of claim 16, wherein the output partial stages of the inverter, which are attributed to the individual phase conductors, are configured to feed at least 75% of the entire maximum feeding power of the inverter into a single phase conductor of the individual phase conductors.

18. The inverter of claim 17, wherein the output partial stages of the inverter, which are attributed to the individual phase conductors, are configured to feed 100% of the entire maximum feeding power of the inverter into a single phase conductor of the individual phase conductors.

* * * * *